United States Patent
Chen et al.

(10) Patent No.: US 7,326,868 B2
(45) Date of Patent: Feb. 5, 2008

(54) BUTTON APPARATUS FOR DISK DRIVE

(75) Inventors: Yun-Lung Chen, Tu-Cheng (TW); Li Tong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 18 days.

(21) Appl. No.: 11/309,110

(22) Filed: Jun. 23, 2006

(65) Prior Publication Data
US 2007/0163867 A1 Jul. 19, 2007

(30) Foreign Application Priority Data
Jan. 13, 2006 (CN) .................. 2006 2 0053815

(51) Int. Cl.
*H01H 9/02* (2006.01)
(52) U.S. Cl. ........................ 200/296; 200/5 A
(58) Field of Classification Search ........ 200/330–334, 200/341–345, 296, 338, 520, 5 A
See application file for complete search history.

(56) References Cited
U.S. PATENT DOCUMENTS

| 5,455,743 | A | * | 10/1995 | Miyajima | 361/781 |
| 5,602,722 | A | * | 2/1997 | Sanpei et al. | 361/730 |
| 6,054,662 | A | * | 4/2000 | Hrehor et al. | 200/332 |
| 6,160,232 | A | | 12/2000 | Lin | |
| 6,867,384 | B1 | * | 3/2005 | Ichihara et al. | 200/343 |
| 6,960,732 | B1 | * | 11/2005 | Spiegel et al. | 200/296 |
| 7,041,922 | B2 | * | 5/2006 | Geiger et al. | 200/296 |
| 7,123,473 | B2 | * | 10/2006 | Xu | 361/683 |
| 7,189,932 | B2 | * | 3/2007 | Kim | 200/5 R |

* cited by examiner

Primary Examiner—Elvin Enad
Assistant Examiner—Lisa Klaus
(74) Attorney, Agent, or Firm—Wei Te Chung

(57) ABSTRACT

A button apparatus for an electronic component (10) having a button (16) includes a computer bezel (20) and a pressing member (30) pivotally attached to the computer bezel for pressing the button of the electronic component. The computer bezel includes a front panel (22) and a flange (24) extending from a side of the front panel, an opening (221) is defined in the front panel. The pressing member includes a pressing portion (32) received in the opening for pushing the button and a resilient piece (34) abutting against the flange for urging the pressing portion to pivotally rebound to an original state from a deformed state at which the pressing portion pushes the button.

19 Claims, 5 Drawing Sheets

BUTTON APPARATUS FOR DISK DRIVE

FIELD OF THE INVENTION

The present invention relates to button apparatuses, and more particularly to a button apparatus for a disk drive.

DESCRIPTION OF RELATED ART

A computer bezel normally has a plurality of buttons for controlling switches of disk drives or other electronic devices which are mounted behind a front panel of a computer. A button on the computer bezel is pressed to trigger the switch thereby controlling the electrical devices of the computer.

A conventional push button assembly adapted to be mounted to a bezel includes a button body and a pair of anchoring members arranged on opposite sides of the button body and connected to the button body by resilient arms for resiliently supporting the button body. Each anchoring member forms a plurality of ledges for being interferentially inserted into and engaging with corresponding holes defined in the bezel thereby mounting the button body to the bezel. The bezel defines a bore through which a post extending from the button body extends for being accessible to a user. The button body has an inner end adapted to drivingly engage with a switch whereby when the post is depressed, the button body moves under the resilient support of the resilient arms to engage with and thus actuate the switch. However, the post protrudes from the computer bezel in order to facilitate pressing the pressing portion to a user. The exterior appearance of the computer is not smooth and harmonious. Furthermore, the push button assembly is secured to the bezel by the ledges inserted into the holes, the push button assembly often breaks off the bezel after being used for a long time.

What is needed, therefore, is a button apparatus with firm configuration and harmonious appearance.

SUMMARY OF THE INVENTION

A button apparatus for an electronic component having a button includes a computer bezel and a pressing member pivotally attached to the computer bezel for pressing the button of the electronic component. The computer bezel includes a front panel and a flange extending from a side of the front panel, an opening is defined in the front panel. The pressing member includes a pressing portion received in the opening for pushing the button and a resilient piece abutting against the flange for urging the pressing member to rebound to its original state from a deformed state at which the pressing portion pushes the button.

Other advantages and novel features of the present invention will be drawn from the following detailed description of preferred embodiment of the present invention with the attached drawings, in which:

DETAILED DESCRIPTION OF THE INVENTION

Figure 1:
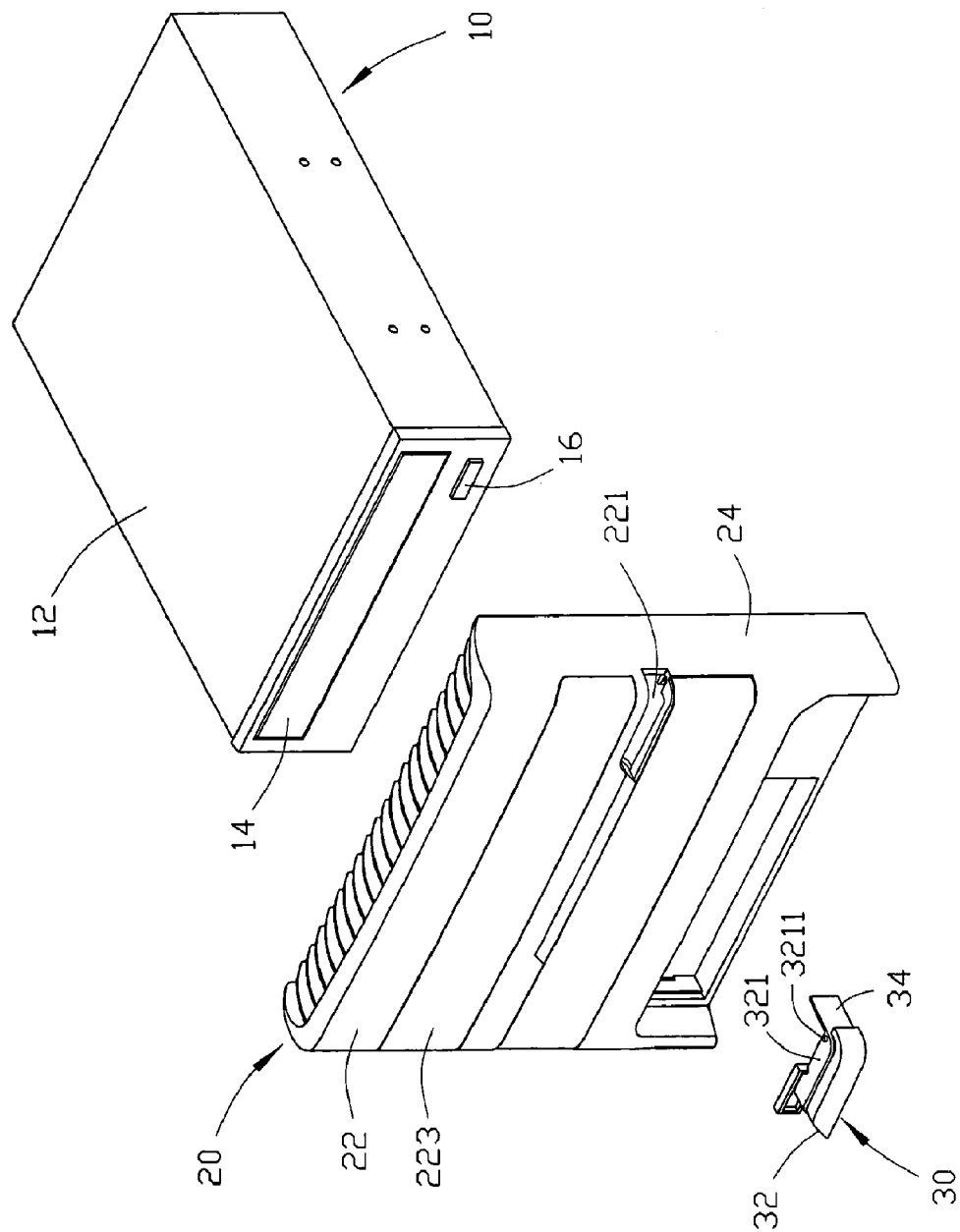
FIG. 1 is an exploded, isometric view of a button apparatus together with an optical disk drive in accordance with a preferred embodiment of the present invention, the button apparatus including a computer bezel and a pressing member.

Referring to FIG. 1, a button apparatus for an electronic component of a computer in accordance with a preferred embodiment of the present invention includes a computer bezel 20 and a pressing member 30.

The electronic component may be an optical disk drive 10. The optical disk drive 10 includes a body 12 and a tray 14. The tray 14 is configured for holding a disk, and sliding into or out of the optical disk drive 10. A button 16 is attached to a front panel of the body 12 below the tray 14. The button 16 controls movement of the tray 14 when pressed.

Figure 2:
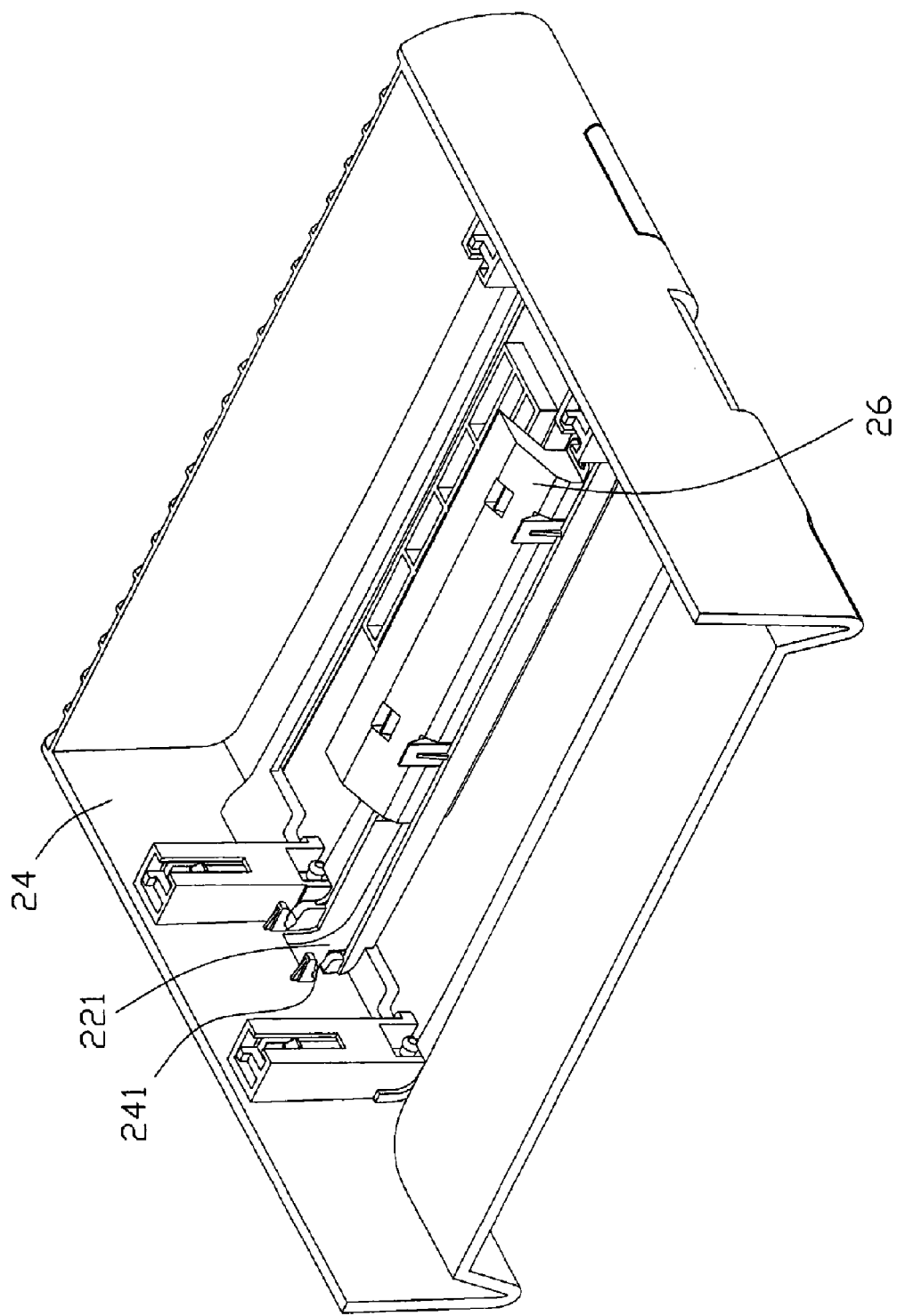
FIG. 2 is an enlarged, isometric view of the computer bezel of FIG. 1, but viewed from another aspect.

Referring to FIG. 1 and FIG. 2, the computer bezel 20 includes a front panel 22 and a side flange 24 extending rearward from the front panel 22 of which the joint is arc-shaped. An opening 221 is defined in the front panel 22 adjacent to the flange 24 for receiving the pressing member 30. A rectangular shaped opening 223 is defined in the front panel 22 above the opening 221, corresponding to the tray 14 of the disk drive 10. A pair of open sliding slots 241 each having an entrance is defined in the interior side of the flange 24. The sliding slots 241 are located near two end corners of the opening 221 respectively. A stopping block 26 is attached inside the front panel 22 for resisting the pressing member 30.

Figure 3:
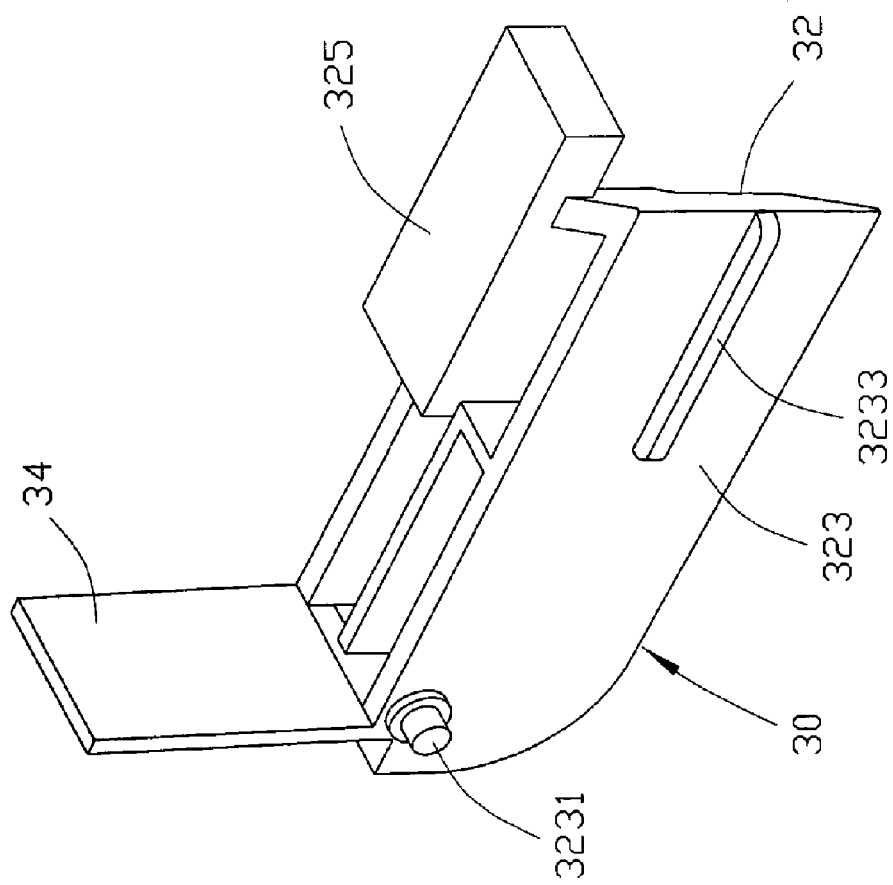
FIG. 3 is an enlarged, isometric view of the pressing member of FIG. 1, but viewed from another aspect.

Referring to FIG. 1 and FIG. 3, the pressing member 30 includes a pressing portion 32 and a resilient piece 34 connected with the pressing portion 32. The resilient piece 34 extends rearward from one end of the pressing portion 32. A resisting portion 325 is formed on the other end at a back side of the pressing portion 32, corresponding to the button 16 of the disk drive 10. The pressing portion 32 further includes a first sidewall 321 and a second sidewall 323 parallel to the first sidewall 321. A pivoting post 3211 protrudes out from the first sidewall 321, and another pivoting post 3231 protrudes out from the second sidewall 323 opposite to the pivoting post 3211. The pivoting posts 3211, 3231 are both defined on an end near the resilient piece 34 of the first sidewall 321 and the second sidewall 323 and capable of sliding into the sliding slots 241 of the computer bezel 20 respectively. A long protrusion 3233 is formed on the second sidewall 323. One end of the front side of the pressing portion 32 is arc-shaped; and one end of the opening 221 of the front panel 22 adjacent to the flange 24 is correspondingly arc-shaped. The other end of the opening 221 is an incline section, and the other end of the pressing portion 32 is an incline section correspondingly.

Figure 4:
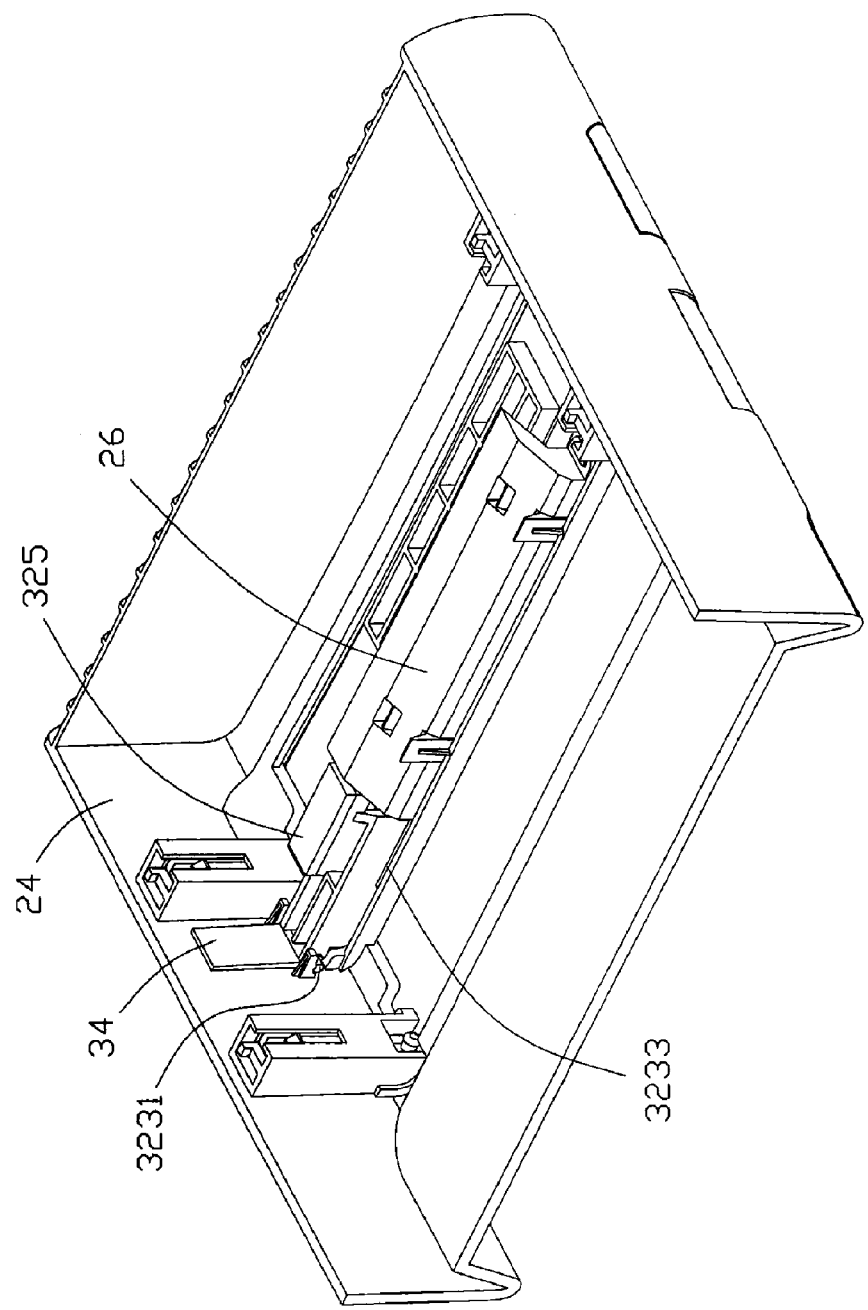
FIG. 4 is an assembled isometric view of the computer bezel of FIG. 2 and the pressing member of FIG. 1.
Figure 5:
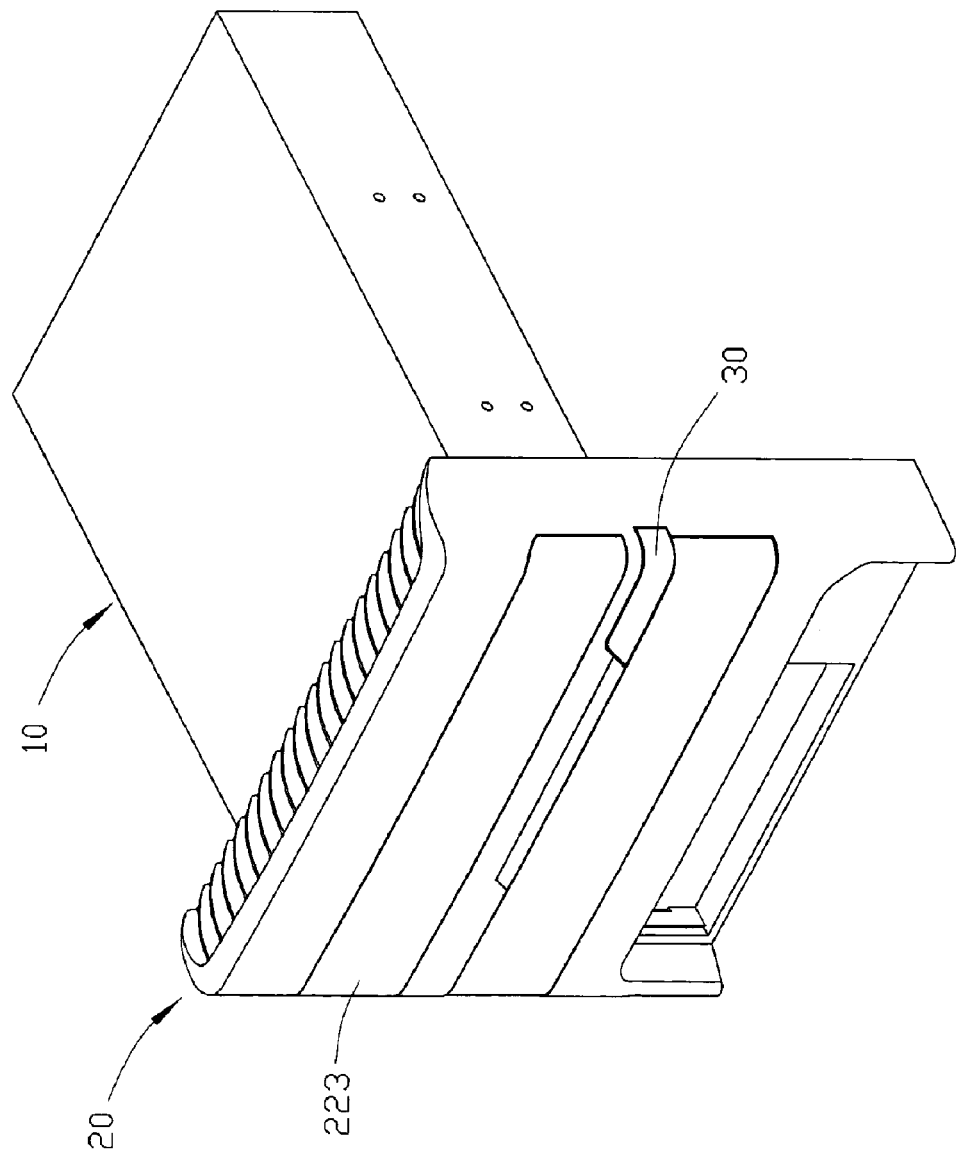
FIG. 5 is an assembled isometric view of FIG. 1.

Referring also to FIG. 4, in assembly of the pressing member 30, the pivoting posts 3211, 3231 slide into the sliding slots 241 from the entrances respectively. The pressing portion 32 of the pressing member 30 is received into the opening 221 of the front panel 22 of the computer bezel 20 and the long protrusion 3233 abuts against the inner side of the front panel 22 for preventing the pressing portion 32 from protruding out from the opening 221 of the computer bezel 20. The resilient piece 34 abuts against the interior side of the flange 24 of the computer bezel 20. The exterior appearance of the pressing portion 32 of the pressing member 30 and the front panel 22 is smooth when the pressing member 30 is in an original state, so that the appearance of the computer bezel 20 is harmonious. The stopping block 26 is mounted to the inside of the computer bezel 20 and resists the distal end, away from the resilient piece 34 of the pressing member 30, of the pressing portion 32, so that the posts of the pressing member 30 cannot move out from the siding slots 241 of the computer bezel 20. Thus the pressing member 30 is pivotally attached to the computer bezel 20.

Before use, the disk drive 10 is fixed within the computer behind the front panel 22 of the computer bezel 20. The tray 14 of the disk drive 10 is aligned with the rectangular opening 223 of the computer bezel 20. The resisting portion 325 of the pressing member 30 reaches to the button 16 of the disk drive 10.

In use, when pressing one end, away from the flange 24 of the computer bezel 20, of the pressing portion 32 of the pressing member 30, the pressing portion 32 of the pressing member 30 pivots in about the posts and the resisting portion 325 of the pressing member 30 pushes the button 16 of the disk drive 10, the pressing member 30 is deformed and the angle between the pressing portion 32 and the resilient piece 34 is diminished. Thereby the tray 14 of the disk drive 10 is actuated to extend out from the opening 223 of the computer bezel 20. After releasing the pressing portion 32, the pressing portion 32 pivots out and the pressing member 30 rebounds to an original state. When pressing the pressing portion 32 once again, the resisting portion 325 of the pressing member 30 pushes the button 16 of the disk drive 10 again. Thereby the tray 14 of the disk drive 10 enters the optical disk drive 10 again.

While the present invention has been illustrated by the description of preferred embodiment thereof, and while the preferred embodiment has been described in considerable details, it is not intended to restrict or in any way limit the scope of the appended claims to such detail. Additional advantages and modifications within the spirit and scope of the present invention will readily appear to those skilled in the art. Therefore, the present invention is not limited to the specific details and illustrative example shown and described.

What is claimed is:

1. A button apparatus for an electronic component having a button, comprising:
   a computer bezel configured for covering one side of the electronic component where the button locates, the computer bezel comprising a front panel with an opening defined in and a flange extending from a side of the front panel; and
   a pressing member pivotally attached to the computer bezel, the pressing member having an original state and a deformed state at which the pressing member pushes the button, the pressing member comprising a pressing portion received in the opening for pushing the button and a resilient piece abutting against the flange for urging the pressing portion to pivotally rebound and the pressing member to come back to the original state from the deformed state.

2. The button apparatus as recited in claim 1, wherein the pressing portion comprises a first sidewall and a second sidewall parallel to the first sidewall, a pair of pivoting posts near the resilient piece protrudes out from the first and second sidewalls respectively.

3. The button apparatus as recited in claim 2, wherein a pair of sliding slots is defined in the flange for receiving the pivoting posts, a stopping block is formed at an inner side of the front panel and abuts the pressing member for preventing the pressing member from moving out from the sliding slots.

4. The button apparatus as recited in claim 2, wherein a long protrusion is formed on one sidewall and abuts an inner side of the front panel for preventing the pressing portion protruding from the opening of the computer bezel.

5. The button apparatus as recited in claim 1, wherein one end of a front side of the pressing portion adjacent to the resilient piece is arc-shaped, one end of the opening adjacent to the flange is arc-shaped correspondingly.

6. The button apparatus as recited in claim 1, wherein a resisting portion is defined on the backside of the pressing portion reachable to the button.

7. A computer system, comprising:
   a computer bezel having a front panel;
   an electronic component having a button, the electronic component fixed behind the front panel of the computer bezel; and
   a pressing member pivotally attached to the front panel of the computer bezel, the pressing member comprising a pressing portion and a resilient piece extending from the pressing portion;
   wherein the pressing portion and the resilient piece form an angle which is diminished when the pressing portion is pressed to push the button, and is increased when the pressing portion is released and rebounding.

8. The computer system as recited in claim 7, wherein an opening is defined in the front panel of the computer bezel for receiving the pressing portion of the pressing member, the computer bezel further comprises a flange, the resilient piece abuts against the flange.

9. The computer system as recited in claim 8, wherein one end of a front side of the pressing portion adjacent to the resilient piece is arc-shaped, one end of the opening adjacent to the flange is arc-shaped correspondingly.

10. The computer system as recited in claim 9, wherein another end of the opening is an incline section, another end of the pressing portion is an incline section correspondingly.

11. The computer system as recited in claim 8, wherein the pressing portion comprises a first sidewall and a second sidewall parallel to the first sidewall, a pair of pivoting posts near the resilient piece protrudes from the first and second sidewalls respectively.

12. The computer system as recited in claim 11, wherein a pair of sliding slots is defined in the flange for receiving the pivoting post, a stopping block is provided at an inner side of the front panel and abuts the distal end of the pressing portion for preventing the posts moving out from the sliding slots.

13. The computer system as recited in claim 7, wherein the electronic component comprises a tray and a rectangle opening corresponding to the tray is defined in the front panel of the computer bezel.

14. A computer system, comprising:
   an electronic component having a button;
   a computer bezel covering one side of the electronic component at which the button is located; and
   a unitary pressing member pivotally attached to an inner side of the computer bezel, the pressing member comprising a pressing portion configured for pushing the button of the electronic component when pressed to a deformed position, and a resilient portion abutting the computer bezel and configured for actuating the pressing portion to rebound to an original state from the deformed state.

15. The computer system of claim 14, wherein the computer bezel defines an opening, the pressing portion covers the opening without extending beyond the computer bezel.

16. The computer system of claim 15, wherein the computer bezel comprises a panel and a frange extending perpendicularly from the panel, the flange defines a pair of open slots, the pressing portion forms a pair of posts pivotably received in the slots.

17. The computer system of claim 16, wherein the resilient piece extends from one end of the pressing portion and abuts an inner side of the flange, and a stopping block extends from an inner side of the slots.

18. The computer system of claim 15, wherein a protrusion is formed at an inner side of the pressing portion and abuts the inner side of the computer bezel to stop the pressing portion extending beyond the computer bezel.

19. The computer system of claim 15, wherein one end of the opening adjacent to the flange is arc-shaped, and one end of the pressing portion has a configuration matching with the arc-shaped end of the opening.

* * * * *